Patented Oct. 9, 1928.

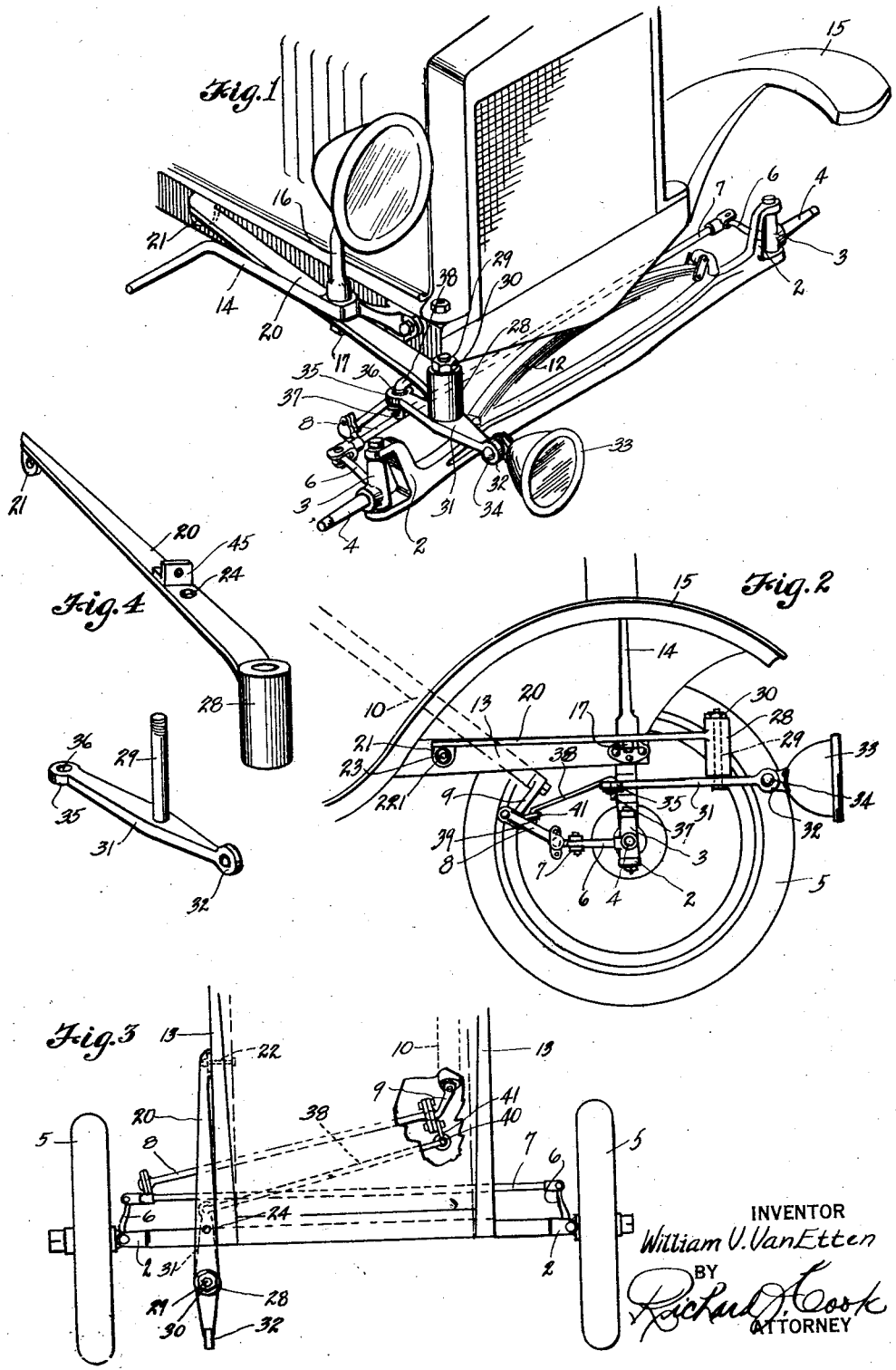

1,686,996

UNITED STATES PATENT OFFICE.

WILLIAM V. VAN ETTEN, OF EVERETT, WASHINGTON.

DIRIGIBLE SPOTLIGHT FOR AUTOMOBILES.

Application filed November 3, 1925. Serial No. 66,483.

This invention relates to improvements in spotlights for motor vehicles, and more particularly to a dirigible spotlight that is especially designed for use on Ford automobiles; it being the principal object of the invention to provide a spotlight having supporting mechanism that my be easily and readily attached to the vehicle without necessitating the removal or alteration of parts as already provided and which has control mechanism connected with the vehicle steering mechanism in such manner that the light will always be cast in the same direction relative to the direction of travel of the vehicle.

Other objects of the invention reside in the various details of construction and combination of parts embodied in the invention and in the mode of operation.

In accomplishing these and other objects of the invention, I have provided the improved details of construction, the preferred forms of which are illustrated in the accompanying drawings, wherein—

Figure 1 is a perspective view, showing a part of a Ford automobile and a dirigible spotlight mounted thereon in accordance with the present invention.

Figure 2 is a side elevation of the same.

Figure 3 is a plan view showing the disposition of the light on the vehicle frame and the manner of operating it from the steering mechanism of the vehicle.

Figure 4 is a perspective view of parts of the device detached from the vehicle and in disassembled relation.

Referring more in detail to the drawings—

1 designates the front axle of a Ford automobile having yokes 2 at its ends wherein steering knuckles 3 are pivotally fixed in the usual manner. These knuckles are provided with spindles 4 on which the steering wheels 5 of the vehicle revolve and also with the usual rearwardly projecting arms 6 which are joined by the connecting rod 7. The rod 7 has a ball and socket connection near one end with one end of a rod 8 which, at its other end, is likewise attached to the end of an arm 9 that is fixed to the lower end of the steering column 10 by means of which the vehicle operator controls its direction of movement.

Supported from the axle 1 by means of a spring 12, is the front end of the vehicle frame comprising the opposite side beams 13 as a part thereof and attached to these beams, near their forward ends, are laterally and upwardly extending braces 14 which serve as the supports for the front fenders 15 and also as mountings for the headlight standards 16 which extend vertically therethrough and are secured by nuts 17 threaded onto their lower ends.

The present device is an attachment for the vehicle as above described, and consists of a flat mounting bar 20 that is disposed parallel with and adjacent the outside of the beam 13 opposite the side on which the steering column is mounted. At its rearward end the bar is provided with a vertically turned ear 21 through which a bolt 22, that is fixed in the beam, is extended and a nut 23 secures the ear to the bolt. The forward portion of the bar is extended directly beneath the lower end portion of the fender supporting brace 14 at that side and is provided with aperture 24, through which the lower end portion of the headlight standard 16 is extended and the nut 17 that holds the standard serves also to attach and to secure the bar rigidly in place.

The forward end of the bar 20 extends somewhat in front of the axle 1 provided with a vertical bearing sleeve 28, and rotatable therein is a shaft 29 having a nut 30 threaded onto its upper end to retain it in place and having a horizontal, spotlight mounting bracket 31 fixed to its lower end so as to be revolved by the shaft and to normally extend in the longitudinal direction of the vehicle.

At its forward end the bracket 31 is provided with a flattened, vertically disposed end portion 32 to which a spotlight 33 is adjustably fixed by a bolt 34 and at its rearward end it has a horizontally disposed flattened end portion 35 provided with an aperture 36, through which the downward end 37 of the connecting rod 38 is pivotally fixed. The other end of the rod 38 is provided with a downturned end 39 that is pivotally contained in an aperture 40 in a link 41 that is rigidly fixed to the lower end of the steering column arm 9. The connecting bar 37 is of such length and all the parts are so adjusted that the spotlight will, through its connection with the vehicle steering mechanism, be caused to turn in accordance with the direction of travel of the vehicle.

In certain types of cars where the lamp standards 16 are not used, the bar 20 may be secured to base 14 by extending a bolt through a flange 45 that is secured to the bar just back of the aperture 24 and through the brace.

Such devices may be applied without necessitating the removal of any parts of the vehicle and in no way hinder the steering of the vehicle.

Having thus described my invention, what I claim as new therein and desire to secure by Letters-Patent, is:

In a vehicle of the character described having a steering mechanism and a side beam with a fender mounting brace bar fixed thereto and extending laterally from the beam and a headlight mounting standard having a threaded lower end extending through the said brace bar, of an elongated bar disposed adjacent the side beam, an ear at the rear end of said bar adapted for attachment to the beam; said bar having an aperture therethrough near its forward end adapted to receive therein the threaded end of the standard, a vertical bearing sleeve at the forward end of the bar, a shaft rotatably contained in the sleeve, an arm fixed between its ends to the lower end of the shaft, means for mounting a spotlight at the forward end of the arm and a link connecting the rear end of the arm with the vehicle steering mechanism.

Signed at Seattle, King County, Washington, this 30th day of September, 1925.

WILLIAM V. VAN ETTEN.